United States Patent [19]

Schrader et al.

[11] Patent Number: 5,649,115
[45] Date of Patent: Jul. 15, 1997

[54] TRACKING METHOD AND APPARATUS

[75] Inventors: Joseph Alton Schrader, Mountain View; Lun-Shin Yuen, Palo Alto; Martin Oishi Gates, Sunnyvale; Robert Milton Schulman, Atherton, all of Calif.

[73] Assignee: Intuit, Inc., Menlo Park, Calif.

[21] Appl. No.: 252,670

[22] Filed: Jun. 2, 1994

[51] Int. Cl.⁶ .................................................... G06F 3/147
[52] U.S. Cl. .......................... 395/233; 395/230; 395/232; 235/379; 235/380; 235/381
[58] Field of Search ..................... 364/408, 401; 235/379, 380, 381; 395/230, 232, 233

[56] References Cited

U.S. PATENT DOCUMENTS

| | | | |
|---|---|---|---|
| 4,910,696 | 3/1990 | Grossman et al. | 364/705.02 |
| 4,939,514 | 7/1990 | Miyazaki | 341/22 |
| 5,221,838 | 6/1993 | Gutman et al. | 235/379 |

OTHER PUBLICATIONS

"Intuit takes first step to provide instant financial organization . . . ", PR Newswire Jun. 3, 1993.
"Kiplinger's CA–Simply Money . . . " Morochove, R.,PC World, v11, n8, p95 Aug. 1993.
"Pocket Quicken on Bookman lets you bring you travel expenses home . . . " Yakal, K., Computer Shopper v16, n2 p507 Feb. 1996.

Tec Corp. Fujiwara, Y., Pub. #07–262458, Oct. 13, 1995.
"Tally trip totals fast . . . " Gabel, D., Windows Magazine, v6, n14, p196 Dec. 1, 1995.
Quicken, User's Guide, Version 2 for Windows © 1992 Intuit pp. 104–108.

*Primary Examiner*—Robert A. Weinhardt
*Assistant Examiner*—Gita Shingala
*Attorney, Agent, or Firm*—Fenwick & West LLP

[57] ABSTRACT

A tracking method and apparatus for use with a computer including a processor for executing code, input/output devices for providing data, memory for storing account data and a display. In operation, a plurality of transaction images are displayed on the computer display. In response to selection of one of the transaction images, a corresponding entry sequence is executed. The execution causes a display of one or more entry fields for receiving transaction data in response to the execution of the entry sequence. The transaction data is entered in response to the entry sequence and the entry fields displayed. The transaction data entered is stored in an account store corresponding to the selected one of the transaction images. Each account has a plurality of fields for data. The entry fields presented by the entry sequence are only the ones necessary for the particular transaction as determined by the selected transaction image and the corresponding entry sequence.

47 Claims, 4 Drawing Sheets

TRACKING METHOD AND APPARATUS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to methods and apparatus for tracking personal and business information and specifically to computer software and hardware optimized for easy use in tracking information.

2. Description of the Related Art

The tracking of information occurs in many different fields and environments. For example, tracking is required for financial information, for mileage information, for inventory information and for many other purposes.

In the financial information field, computer programs, such as Quicken®, Managing Your Money™, Microsoft Money™, or Simply Money™, help users to track financial transactions using a computer. These computer programs are designed to work the same way that users tend to manage their finances at a desk where bills are gathered and paid and where finances are otherwise kept in order. These programs satisfy the needs of users that enter batches of transactions serially for the same account.

By way of example and for batch processing of a checking account, users typically enter all check transactions for the account at one time. Transactions for other accounts tend to be entered at some other time. Computer programs designed for such batch processing use a multi-line "register" metaphor for data entry. With such a "register" metaphor, a user picks the account register, such as a checking account register, from a list of accounts and then remains in that account register to enter a series of account transactions. The user enters data for one transaction into one line of the multi-line register, saves it, and then returns to the next "line" in the register where the user enters the next transaction for the same account. The sequencing method is from line to line in a multi-line register for a single account. Such methods are optimized to allow users to select the account for a series of transactions and then enter each of the transactions for that account. Such methods frequently require a number of steps preceding selecting an account for any register entry and hence are not designed for easy switching between accounts.

While the register metaphor works well for desktop batch-entry of data, the register method of tracking data is burdensome where transactions are not entered in batches. In the mobile environment, for example, tracking based upon batch methods tends to be inefficient. Mobile devices such as DOS-based palmtop computers, for example, Hewlett-Packard HP95LX or HP100LX palmtop computers, can track finances using desktop financial programs with register metaphors that are cumbersome when ease of account switching is important.

In the mobile environment, users move frequently from one merchant to another and often switch from one type of payment instrument to another. For example, a user may use cash as the payment instrument for a cash account at a gas station, may use a check as the payment instrument for a checking account at a grocery store, and may use a credit card as the payment instrument for a charge account at a restaurant. In such a mobile environment, users need to track account transactions quickly and therefore need to switch quickly and easily between payment instruments or accounts.

In light of this background, there is a need for improved transaction tracking.

SUMMARY OF THE INVENTION

The present invention is a tracking method and apparatus for use with a computer including a processor for executing code, input/output devices for providing data, memory for storing account data and a display. In operation, a plurality of transaction images are displayed on the computer display. In response to selection of one of the transaction images, a corresponding entry sequence is executed. The execution causes a display of one or more entry fields for receiving transaction data in response to the execution of the entry sequence. The transaction data is entered in response to the entry sequence and the entry fields displayed. The transaction data entered is stored in an account store corresponding to the selected one of the transaction images. Each account has a plurality of fields for data. The entry fields presented by the entry sequence are only the ones necessary for the particular transaction as determined by the selected transaction image and the corresponding entry sequence.

In one embodiment, the present invention is a financial tracking method for a computer that includes a "Wallet", a representation of images of transaction instruments (such as credit cards, cash, checks or other payment instruments) displayed in a visual representation of a wallet, thereby using a wallet metaphor for tracking financial data. The images identify the accounts the user is tracking. For example, the "cash" image represents tracking a cash account; the "check" image represents tracking a checking account, and one or more "credit card" images represent tracking of one or more credit card accounts. Users may configure the "wallet" images to match the types and number of accounts to be tracked.

The wallet provides the ability to select from among wallet images to provide an easy method for selecting and switching between accounts, and this method is particularly useful in mobile and other single account transaction environments.

The selection of an image, in accordance with the present invention, also selects a predetermined transaction entry sequence by which transaction data is entered by the user. The transaction entry sequence automatically steps the user through a sequence to access one or more fields using only a preselected subset of the full set of fields associated with the account.

To record a transaction for a financial account, the user selects (with a pen-like device, stylus or other I/O input) an image of a transaction instrument corresponding to the account to be charged. The present invention then displays a visual representation of a "receipt" with transaction fields to enable entry of information for the transaction, such as the date, the amount of the expense, the merchant, a description of the expense, the category into which the expense falls (such as "clothing", "transportation" or "dining"), and, if the expense is a business transaction, which trip, client or project applies to the expense. Next, the "receipt", or more specifically the entered transaction information, is recorded in the account store. When done with a transaction, the computer program returns to the wallet display to again display the transaction images so that the user can repeat the process to record another transaction for the same or for another account.

The present invention makes it easy for users to record single transactions or small batches of transactions where there is frequent switching between accounts. The present invention uses a simple visual interface, such as a "wallet", that is easy to learn, easy to use, and easy to remember how to use, thereby making the entry of transaction data fast and simple.

The foregoing and other objects, features and advantages of the invention will be apparent from the following detailed description in conjunction with the drawings.

DETAILED DESCRIPTION

Figure 1:
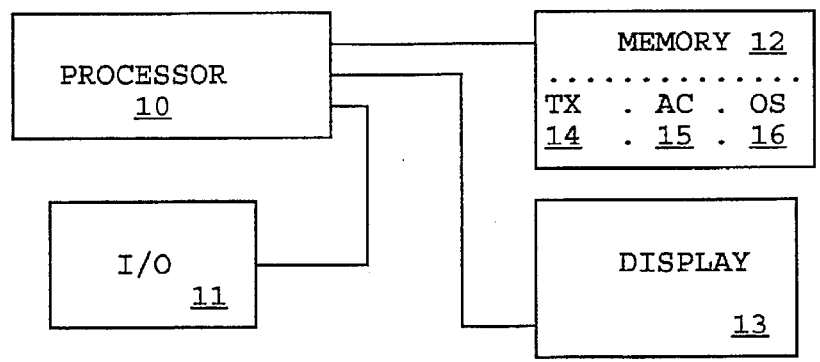
FIG. 1 depicts a block diagram of a personal digital assistant or other computer which stores tracking software in memory.

In FIG. 1, a block diagram of a personal digital assistant or other computer 5 is shown for executing the tracking method of the present invention. The computer 5 of FIG. 1 includes a conventional processor 10, input/output (I/O) devices 11, memory 12 and display 13. The memory 12 stores the operating system 16 for the computer 5, executable computer software 14 which implements the tracking method of the present invention and includes the account store 15 where account transaction data is stored. Preferably the computer of FIG. 1 is a small lightweight portable hand-held computer.

Figure 2:
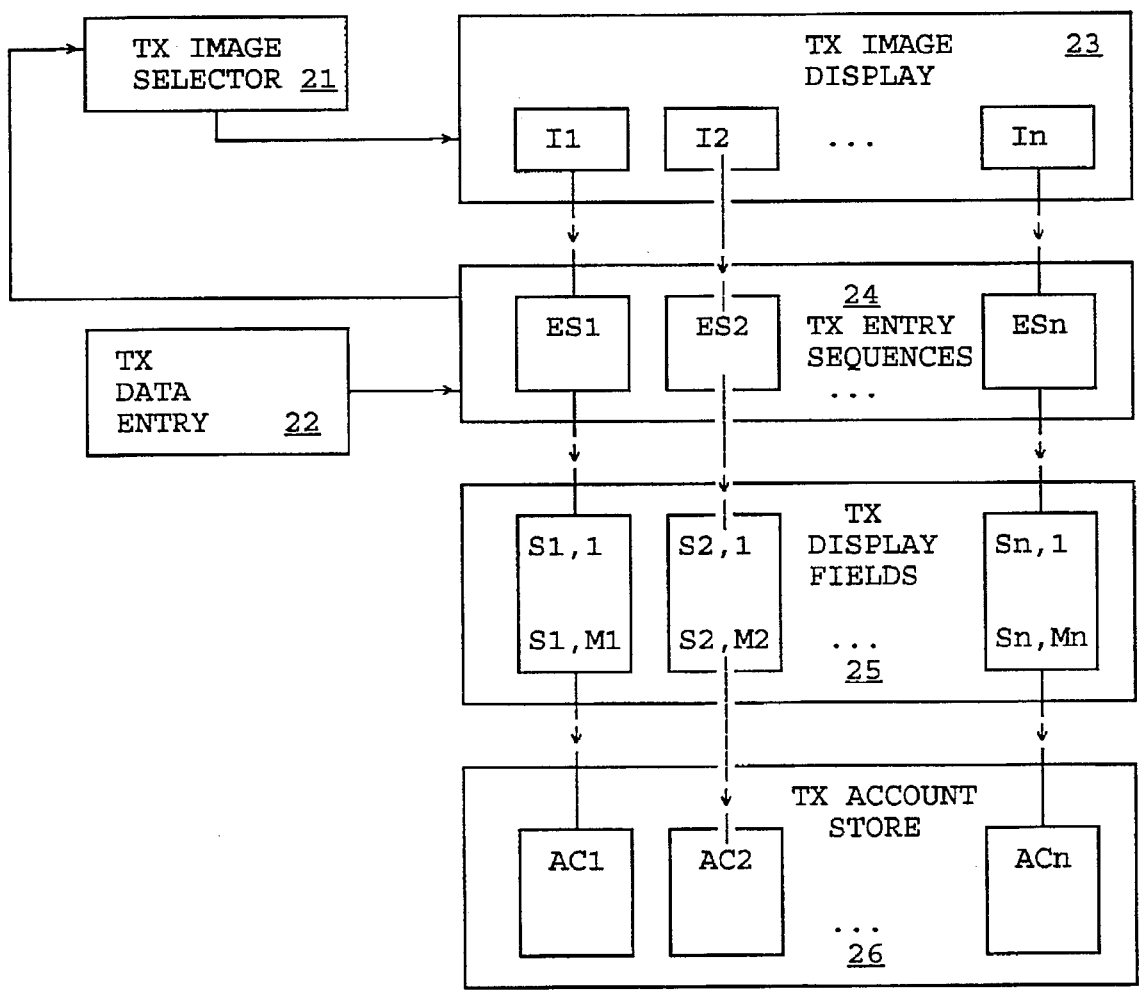
FIG. 2 is a block diagram representation of the tracking software of the present invention.

FIG. 2 depicts a block diagram representation of the transaction software 14 executed by the FIG. 1 system. In FIG. 2, the transaction image display code 23 is, for example, the software which causes the display 13 of FIG. 1 to concurrently display a plurality of transaction images I1, I2, . . . , In. The transaction images are, for a financial transaction example, images of credit cards, cash, bank cards or other instruments that are useful for making or authorizing payment. Specifically, the transaction image I1 may be an image of a VISA card, the image I2 may be a check image that represents checks drawn against a bank checking account and the transaction image In may be an American Express card image. Any number of such transaction instruments may be depicted by the image display code 23 of FIG. 2. For each image displayed by the display code 23, a corresponding account exists under control of the transaction account store code 26. The store code 26 causes account data to be stored in the memory 12 of the computer of FIG. 1. In FIG. 2, the account codes AC1, AC2, . . . , ACn are part of store code 26 and correspond to the transaction images I1, I2, . . . , In, respectively. For each image I1, I2, . . . , In created by display code 23 there exists transaction entry sequence code ES1, ES2, . . . , ESn, respectively.

Similarly, for each of the transaction entry sequence codes ES1, ES2, . . . , ESn there exists one or more sequences of display fields under control of display code 25 including the display sequences S1, S2, . . . , Sn, respectively.

In FIG. 2, transaction selector code 21 exists for selecting one of the images I1, I2, . . . , In in FIG. 2. The selector code 21 is of the type that receives an I/O input from I/O devices 11 in the FIG. 1 system for selection of one of the images I1, I2, . . . , In. For example, a stylus, a pointer, a mouse, a voice activator, a keyboard, a network link, telephone link, a terminal, a host computer or any other user controllable input can be employed as an I/O device 11.

In a similar manner, the data entry code 22 of FIG. 2 is for receiving input from a numerical pad, keyboard or any other I/O device 11 of the FIG. 1 computer system.

The operation of the tracking as executed by the FIG. 2 code occurs as follows. When the computer system of FIG. 1 is turned on or is otherwise initialized, the tracking code 14 in the memory 12 of FIG. 1 automatically executes image code 23 to display the transaction images I1, I2, . . . , In of FIG. 2. In this mode, the display waits until a user through the transaction instrument selector code 21 (through an I/O device 11 of FIG. 1) selects one of the images I1, I2, . . . , In. The selected one of the images causes entry into one of the transaction sequence codes ES1, ES2, . . . , ESn which corresponds to the selected one of the images. Assuming that the I2 image is selected, the ES2 transaction entry sequence code is then executed. The transaction entry sequence code ES2 causes one or more transaction display fields (or sequences of fields) S2 to be displayed. Depending on the complexity of the transaction, the display field S2 may include different fields S2,1, S2,2, . . . , S2, M2, which is a total of M2 fields where M2 may be any integer. For simple transactions, M2 may be only one or other small number so that only a small subset of fields are sequenced for transaction entry. Upon display of a transaction display field by code 25, corresponding to the transaction entry sequence code 24, data entry code 22 is executed, to receive transaction data for the transaction. Upon execution of data entry code 22, the information is stored into the corresponding transaction accounts by store code 26. In the case of the I2 image selection, in the embodiment of FIG. 2, the entry sequence code ES2, the display field code S2, and the account store code AC2 are selected and executed.

In FIG. 2, the one-to-one correlation of the I, ES, S and AC codes is for convenience. In other embodiments, one or more of the modules ES, S and AC can be combined using standard programming techniques so that a one-to-one correlation among the I, ES, S and AC codes is not required.

Figure 3:
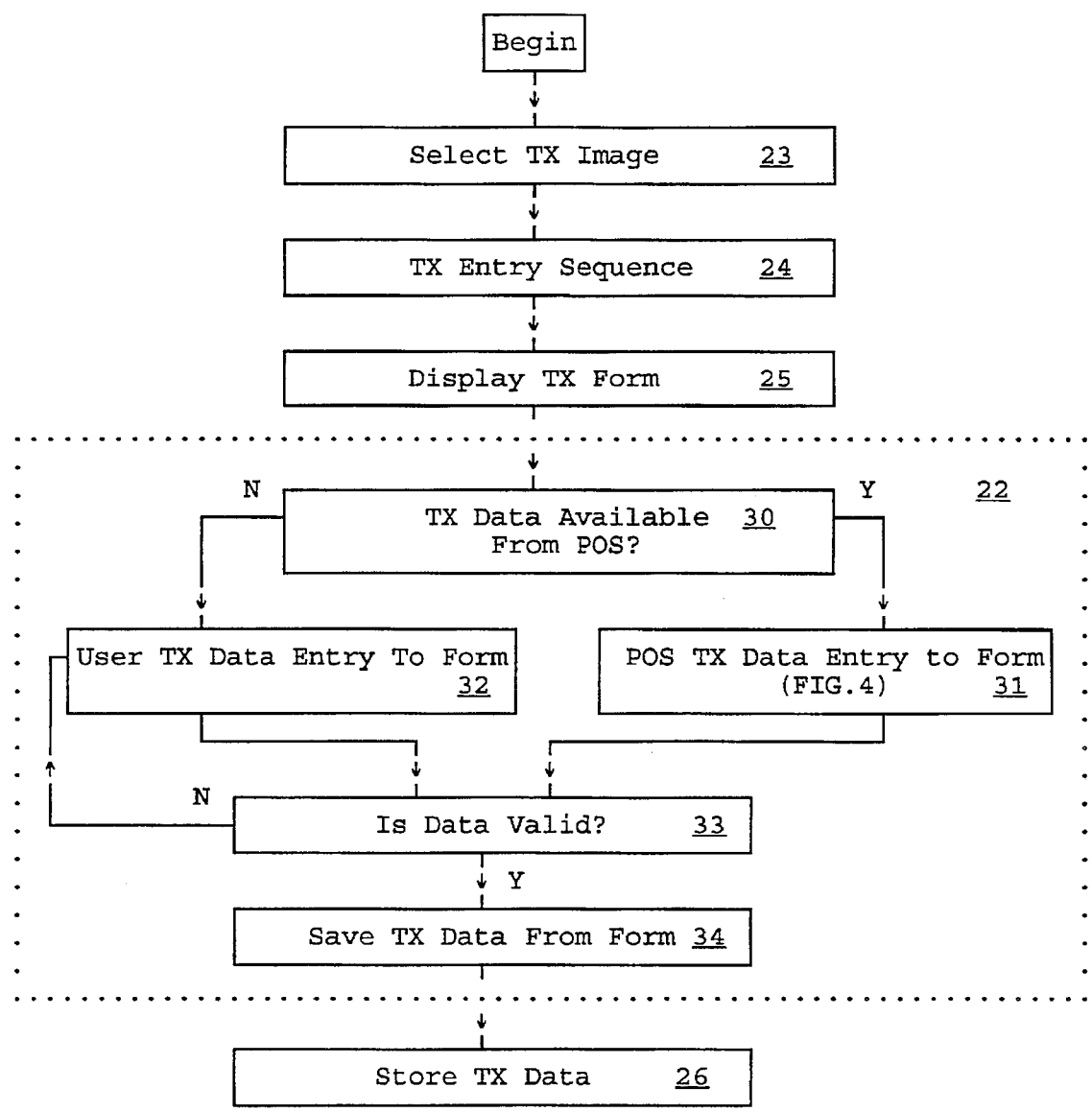
FIG. 3 depicts the operation of the present invention interactively with a point of sale (POS) terminal.

In FIG. 3, a modification to the code of FIG. 2 is shown where the transaction data entry code 22 is expanded to access the transaction data directly from a point of sale (POS) computer. Such a POS terminal can be one of the I/O devices 11 of FIG. 1. The POS terminal may transfer data to the computer of FIG. 1 in any conventional manner.

In operation, upon display of the transaction form by the code 25, the transaction data entry code 22 tests, in test code 30, to determine if the transaction data is available from the POS terminal. If available, a yes output is directed to the entry code 31 for entering the transaction data directly into the form from the POS terminal. If the test code 30 determines that the transaction data is not available from the POS terminal, then a no output connects to the user transaction data entry code 32. The code 32 enters the data directly from the user using a user actuated I/O device 11 of FIG. 1. For either transaction data entry by the POS code 31 or the User code 32, the validity of the entered data is tested in the data valid test code 33. If the entered code is not detected as valid, then a no output returns control to the user input code 32 for entry or correction of entered data. If the entered data is valid, the data test code 33 passes control to the form saving code 34 which saves the data into the form. Thereafter, processing continues as previously described in FIG. 2 where the store transaction data code 26 stores the code into an appropriate one of the store accounts AC of FIG. 2.

Figure 4:
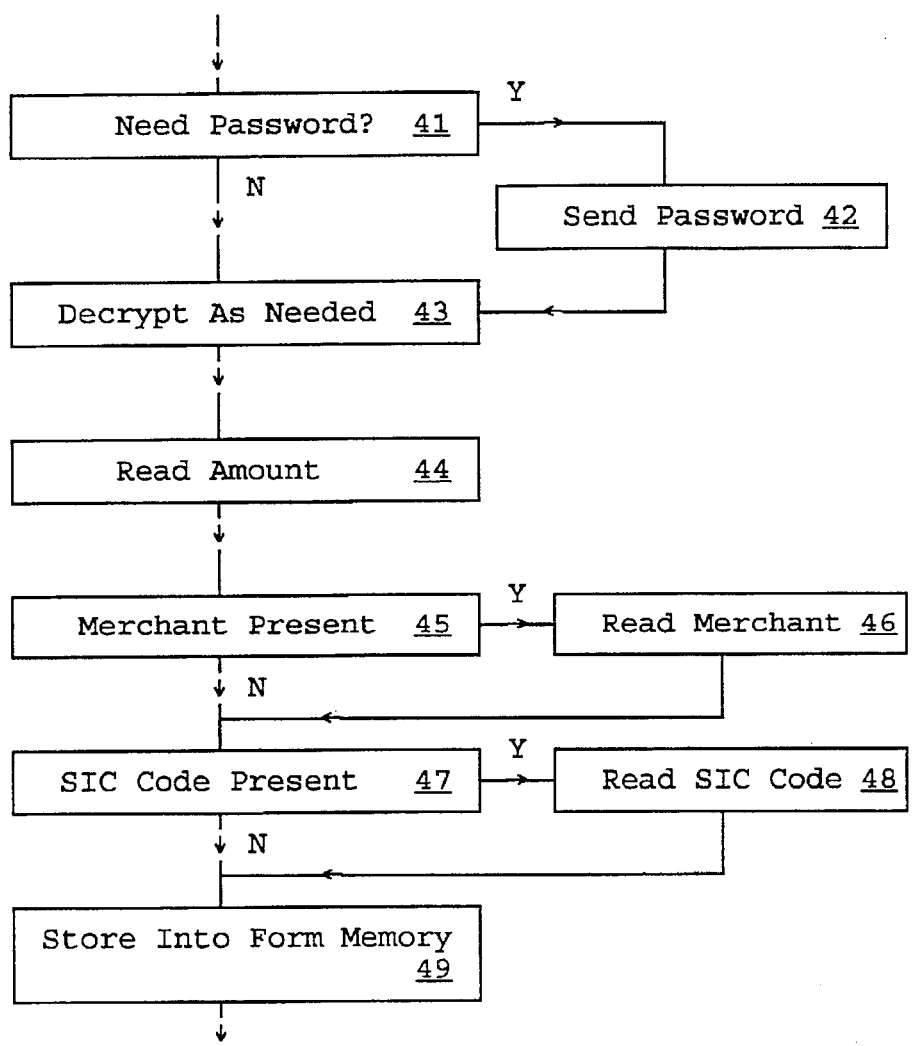
FIG. 4 depicts further details of the sequencing of the point of sale transaction of FIG. 3.

The POS transaction data entry code 31 of FIG. 3 is shown in further detail in FIG. 4.

In FIG. 4, when the test code 30 of FIG. 3 has determined that a POS terminal is available for transaction data entry, the code of FIG. 4 is executed. In FIG. 4, the Need/Password code 41 checks to see if a password is needed. If yes, the send password code 42 provides the password. If the password or any other information requires decryption, the decryption code 43 executes the decryption. Next, the read amount code 44 reads the amount of the transaction. Next, the merchant present code 45 detects whether or not a merchant identifier is available and if yes, the read merchant code 46 provides the read merchant identifier. The Standard Industry Code (SIC) code 47 determines whether or not an SIC code is available. If so, the read SIC code 48 provides the SIC code. With the data entry as provided in FIG. 4, the store into form memory 49 code stores the data into the form for testing for validity by the test code 33 of FIG. 3.

The FIG. 4 embodiment is only one embodiment where certain predetermined fields associated with an account are automatically supplied through the entry sequencing. These automatic operations of FIG. 3 and FIG. 4 greatly simplify the operations required by a user.

The terms used in connection with transaction tracking are defined as follows:

Account

A store of transactions (together with accumulated totals and other information). Examples of accounts are financial accounts, inventory accounts, mileage accounts and category accounts. Examples of financial accounts are bank accounts, credit-card accounts (Visa, Master Card, gasoline company, American Express, and so on) cash accounts, brokerage accounts, loan accounts, and other asset or liability accounts. Examples of category accounts are clothing accounts, food accounts and restaurant accounts.

Transaction

An operation that identifies a transfer in connection with an account. A transaction typically has the following attributes, Date, Amount, Account, Type.

Financial Transaction

An operation that identifies an actual transfer of money in connection with a financial account. A financial transaction typically has the following attributes, Date, Amount, Account, Type (check, charge, payment, transfer, withdrawal, deposit, etc.) The following are typically optional attributes, Cleared Status (reconciled, uncleared), Category/Purpose, Merchant/Description, Memo and Business Expense.

Account Store

A store for storing multiple transactions for an account. Each transaction is typically for only one account. Each account has a balance or total, which is the sum of the amounts of the transactions in that account. Once recorded in the account store, each transaction can be subsequently edited or deleted.

Transaction Image

A display object having a visual representation (image) that is recognizable as a symbol for identifying a transaction, an account, an attribute of an account or other information relating to an account. The visual representations are displayed as icons, buttons, or other similar likenesses. Each transaction image is controllable by the user, that is, the user can select or create a custom image and can locate the image in the display. Selecting a transaction image activates a transaction entry sequence.

Examples of transaction images are transaction instruments and category images.

A transaction instrument is a transaction image that is recognizable as the physical means for enacting a financial transaction. Transaction instruments are likenesses of cash, credit cards, debit cards, checks, ATM cards and other instruments.

A category image is a transaction image that is recognizable as a category such as food, clothing, auto or business.

Wallet

Visual representation of Transaction Instrument images for one or more financial accounts on the same display. The images are selectable/configurable by the user. As an example, a "wallet" may include images for six credit cards, one check, and cash displayed in a visual representation of a wallet, thereby forming a wallet metaphor.

Transaction Entry Sequence

The data entry for a transaction is controlled by a transaction entry sequence whereby entry fields are displayed via a screen form, window, dialog or other display field using any I/O device such as a keyboard, touchscreen, pen, stylus, mouse, voice, an external device such as a point of sale (POS) terminal, network link, telephone link, host computer or any other device that inputs data to each field displayed in sequence. The sequence of display fields is a function of account type as selected by the transaction image. For each transaction image, there is a display sequence of the fields with appropriate attributes, and associated prompts, corresponding to the transaction. As an example, a check image or form has a "check number" field together with "date" and "amount" fields. The charge image form (for credit/debit cards) has a "merchant" field together with "date" and "amount" fields. Some forms share attributes with other forms, but typically as a minimum all forms have "amount" (quantity) and "date".

Entering Transaction Data

1) Select transaction image from wallet;
2) If >1 account for this image (e.g. check transaction image), choose relevant account from the possible/available accounts. Any approach is valid, such as last-used, first-in, list alphabetically, or configurable by user
3) Select appropriate form, based on account type and transaction image.
4) Initialize with default values as a function of account type and transaction image.
5) Accept user inputs
6) Upon confirmation, enter transaction into transaction store.

Viewing

The process of performing calculations and logic to display information about transactions in an account and balances and other information about the account. A view may be for any single transaction showing all the information that was originally entered. Optionally, a view may list other information such as the reconciled balance, the total of all transactions that have been marked as reconciled. Optionally, a view may list transactions or totals of transactions for some or all accounts. Optionally, a view may list transactions or totals of transactions grouped by an attribute, such as category.

Examples of viewing operations that are performable with the computer and software include the following:

Viewing Account Balances
1) Query account store for a list of accounts
2) For each account, compute balance as follows:

$$\Sigma a_i, i=1,n,$$

where $a_i$=mount of transaction i in the account of n transactions
3) Display accounts and balances in appropriate format, as tabular data, fist of icons and associated amounts, etc.

Viewing Transaction Lists
For each account or any other attribute, the wallet can display the transactions it comprises in a list on-screen or in printed form.
1) Choose the account or other attribute to list
2) Build transaction fist as follows:

```
list = nil;
for each transaction t in store
    if t.attribute = target then
        add t to list
```

3) Display/pit transactions from preceding list

Editing Transaction Data
1) View transaction list
2) Select transaction to edit
3) Using type and account as entered in the transaction store, choose appropriate form
4) Display form, with same values as entered in transaction store.
5) Accept user inputs
6) Upon confirmation, reenter transaction into transaction store.

Deleting Transaction Data
1) View transaction list
2) Select transaction to delete
3) Using type and account as entered in transaction store, choose appropriate form.
4) Display form, with same values as entered in transaction store
5) Accept delete command
6) Upon confirmation, delete transaction from transaction store.
—OR—
1) View transaction list
2) Select transaction to delete
3) Accept delete command
4) Upon confirmation, delete transaction from transaction store.

Figure 5:
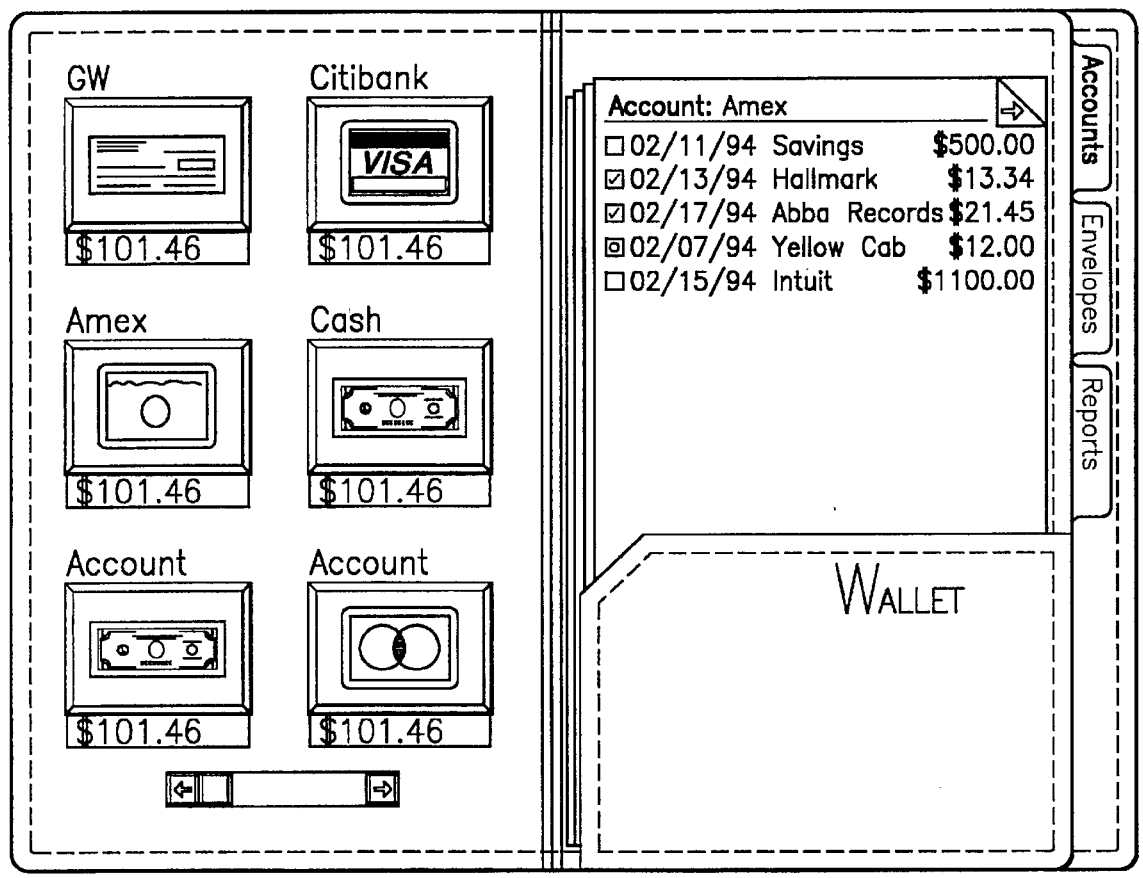
FIG. 5 depicts a screen representation of the wallet metaphor for displaying transaction images.

Wallet Metaphor—FIG. 5
One example of the wallet metaphor is shown in FIG. 5. On the left side of FIG. 5 transaction instruments of the I1, 12, . . . , In type in FIG. 2 are shown in a wallet metaphor. In the wallet metaphor the images shown are for a Great Western (GW) checking account where the transaction instrument is a representation of a check, a Citibank account where the transaction instrument is a representation of a VISA card, and an AMEX account where the transaction instrument is a representation of an AMEX card, a cash account where the transaction instrument is a representation of a $1 bill, another money account where the transaction instrument is a representation of a $1 bill and a Master Card account where the transaction instrument is a representation of a Master Card. In operation, in order to select a transaction with the GW checking account, a stylus or other selection instrument is used to probe the check transaction instrument which appears in the upper left hand corner of the wallet metaphor. With such a selection of the check transaction instrument, the receipt of FIG. 6 is displayed.

Figure 6:
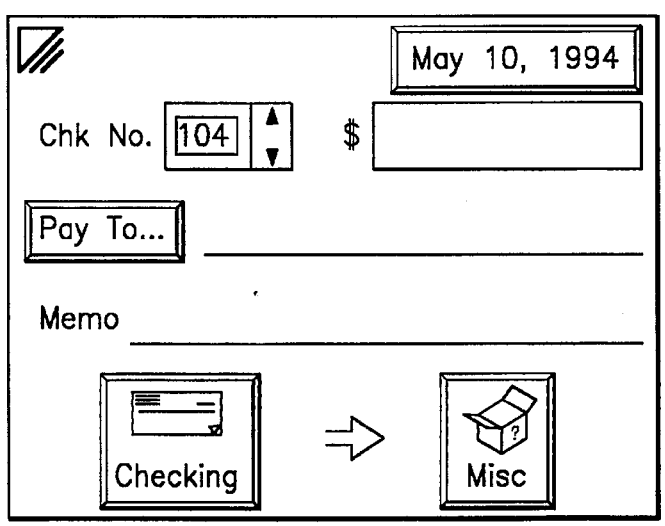
FIG. 6 depicts a screen representation of the "receipt" form for displaying transaction data entry fields.

In FIG. 6, a receipt having display fields is shown. In the receipt of FIG. 6, only the "$" field, the "Pay To" field and the "Memo" field are sequenced in order for entry of the transaction data. The "Chk No." field and the "Date" field (May 10, 1994) are automatically fried in typically without need for user operation.

Figure 7:
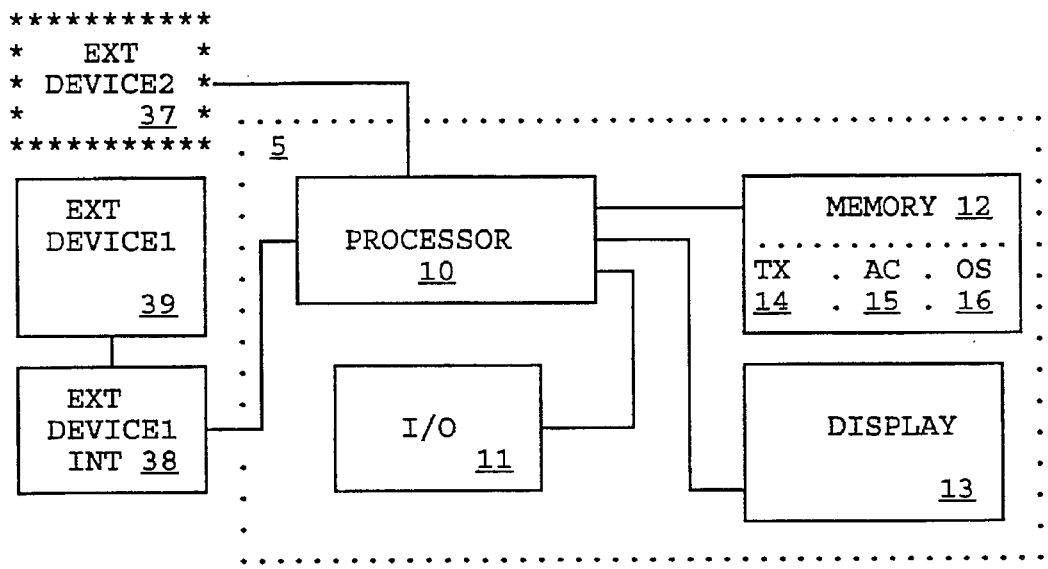
FIG. 7 depicts a block diagram representation of a computer in combination with external devices.

In FIG. 7, the computer 5 of FIG. 1 is shown with the additional inclusion of an external device, such as a point of sale terminal, interface 38 or device 37, such as a host computer. The interface 38 is for connecting to the device, such as point of sale terminal, 39 for the purpose of exchanging information between computer 5 and device 39. Such connection may be through wireless transmission or through any other convenient way of transferring information.

One example of a computer code listing for the tracking of FIG. 2 is included in the CODE LISTING below. In the CODE LISTING, the elements 21, 22, 23, 24, 25, and 26 of FIG. 2 are identified in greater detail as follows:

Element 21—TX Image Selector
In the wallet display, transaction images I1, 12, . . . , In are set up for display by the function MSG_ADD_ACCOUNT_CARDS by code element 23 of FIG. 2. This function sets up objects with images and associated transaction forms. When the transaction images are touched or otherwise selected, the operating system (OS), in response to the I/O sense module's detection of an input, calls the specified function, MSG_REQUEST_OPEN_ACCOUNT. This function in response to the selected transaction image calls MSG_SELECT_NEW_TRANSACTION to get the appropriate transaction slip, which comprises the corresponding one of the Transaction Entry Sequences (24) and the corresponding one or ones of the Transaction Display Fields (25). The operating system 16 of FIG. 1 includes a module for sensing I/O inputs from I/O devices 11.

Element 22—TX Data Entry
The entry sequence presents some or all of the attributes a transaction may have, as appropriate for the selected transaction. For each attribute, them is a set of user interface elements, that constitute a display field, that respond to input to receive the associated attribute's value. Typically, the entry sequence defines the data entry fields, then retrieves the values at the end of the sequence. Each form has a function MSG_TRANSACTION_FORM_INITIALIZE (translip1.goc, translip2.goc, tforms1.goc, check2.goc, receipt.goc, bankslip1.goc, bankslip2.goc), which links the user elements for each attribute including the I/O device 11 elements and the display 13 elements. MSG_SETUP_PICKERS (tforms1.goc) attaches icon-based pickers for each attribute (for example, "checking" and "misc" in FIG. 6), as appropriate, operating system code responds to mouse, pen, keyboard, or other input to operate the user elements including I/O devices 11 and display 13 of FIG. 1. The pickers receive a message from the system when an item is selected, MSG_PICK_ICON, which calls the picker's selection handler, such as MSG_USE_PAYEE for the payee picker, or MSG_USE_MONEYBAG for accounts and categories. The amount editor is a system-provided module for modifying or entering "amount" data. The date picker is a module for modifying the "date" data. The "Memo" field uses a system provided module to receive text input from the system as well.

Element 23—Transaction Image Display

The operating system has conventional routines for drawing bitmapped images. These images are selected when the wallet screen is loaded, based on which accounts and transaction images are available. This setup is done by MSG_ADD_ACCOUNT_CARDS and GetCreditCard-Bitmap. The call to MSG_ADD_NAMED_ICON sets up the images for display. MSG_VIS_DRAW actually draws them using system calls.

Element 24—Transaction Entry Sequences

The first step is to set up the transaction data structure, via MSG_TRANSACTION_INITIALIZE (transact.gh, translip1.goc, translip2.goc, transact1.goc). Then, the transaction display fields of the form are set up via MSG_TRANSACTION_FORM_INITIALIZE, which sets up the user interface on the form. The values in the display fields are initialized by MSG_FILL_SLIP (translip1.goc, translip2.goc, tforms1.goc, check1.goc), which sets up each attribute, e. g. MSG_FILL_DATE (tforms1.goc), MSG_FILL_AMOUNT (tforms1.goc). MSG_FILL_PAYEE (tforms1.goc). The transaction entry sequence is defined by the layout and selection of transaction display fields on the form. MSG_SETUP_PICKERS also defines the user interface, as described above. Within the pickers, MSG_INITIALIZE sets up the picker. When the user hits the save command, MSG_SAVE_SLIP (tforms2.goc) is called to gather data from the display fields using the functions MSG_STUFF_... (tforms2.goc) (MSG_STUFF_SLIP_DATE (tforms2.goc), MSG_STUFF_SLIP_AMOUNT (tforms2.goc), MSG_STUFF_SLIP_PICKER_ITEMS (fforms2.goc), MSG_STUFF_SLIP_PAYEE (tforms2.goc)), etc. Finally, to save the transaction into the account store, MSG_SAVE_TO_LIST (transact.gh, tforms2.goc, transact2.goc) invokes the storing code.

Element 25—Transaction Display Fields

Each display field is an instance of an object supported by the operating system. For each display field, the code links a bitmap (drawn by MSG_VIS_DRAW) or text string to be drawn and retrieves strings for each display field to be drawn. The following functions retrieve strings for display, MSG_GET_AMOUNT_STRING (transact.gh), MSG_GET_DATE_STRING (transact.gh), MSG_GET_PAYEE_STRING (transact.gh), MSG_GET_TYPE_STRING (transact.gh), MSG_GET_MEMO_STRING.

Within the pickers, the icons are drawn using MSG_VIS_DRAW. The icons are set up by MSG_INITIALIZE_ACCOUNT_ICONS, MSG_INITIALIZE_INCOME_ICONS, MSG_INITIALIZE_EXPENSE_ICONS. MSG_DISPLAY_PAYEE_LINE draws each line of text in the payee picker screen.

Element 26—Transaction Account Store

MSG_SAVE_TO_LIST (transact.gh, tforms2.goc, transact2.goc) is the main function for storing transaction data. MSG_ADD_TRANSACTION and MSG_REPLACE_TRANSACTION save a new/replace existing transaction, respectively. These functions use standard indexed file methods.

CODE LISTING

| | |
|---|---|
| transact.gh | transaction structure |
| account.h | account structure |
| translip1.goc | function for creating a new transaction |
| translip2.goc | function for editing an existing transaction |
| tforms1.goc | filling in/setup transaction slip for generic check specialized form |
| check1.goc | check-specific version |
| check2.goc | check-specific version of initializing the form |
| tforms2.goc | code to save transaction from a slip |
| receipt.goc | receipt-slip version of setting up a form |
| bankslip1.goc | withdrawal slip setup |
| bankslip2.goc | deposit slip setup |
| register.goc | sets up editing of transaction based on account type |
| transact1.goc | init a transaction record |
| transact2.goc | save a transaction record into store |
| AmountText | System object that receives/displays a decimal amount |
| LineGenTextClass | System object that receives/displays text. Uses by payee, memo fields |
| LongGenValueClass | System object that receives/displays an integer amount. Used by check number |

Copyright © 1994 Intuit check.goc

CheckInterface   Defines Tx Display fields for a check.  Refers to all constituent objects iconpick.goc MSG_PICK_ICON   reads user's selection for setting an attribute's value MSG_INITIALIZE_ACCOUNT_ICONS   builds list of accounts to choose from MSG_INITIALIZE_INCOME_ICONS   builds list of income categories to choose from MSG_INITIALIZE_EXPENSE_ICONS   builds list of expense categories to choose from MSG_USE_MONEYBAG   sets icon in trans form based on whichever account/category user selected linetext.goc MSG_VIS_TEXT_EDIT_DRAW (remove this listing)   draws line beneath field on transaction form notify.goc MSG_NOTIFY_DOCUMENT_OPENED   respond to system notfications, such as when a data file is activated picker.goc MSG_INITIALIZE   sets up window associated list to display Copyright © 1994 Intuit MSG_USE_PAYEE responds to user choice MSG_DISPLAY_PAYEE_LINE displays a payee in list translip.goc MSG_REQUEST_OPEN_ACCOUNT opens a slip based on specified type MSG_SELECT_NEW_TRANSACTION picks appropriate form vcontent.goc MSG_ADD_NAMED_ICON adds a named icon object to the list MSG_VIS_DRAW draws icon plus name of the named icon object wallet.goc MSG_ADD_ACCOUNT_CARDS adds payment instrument images to display GetCreditCardBitmap gets appropriate image for different credit card instruments

Copyright © 1994 Intuit

TRANSACTION STRUCTURE
(transact.gh)

```
1   // transact.gh
2   // Here is the transaction structure.
3
4   @class TransactionClass, QuickenMetaClass;
5
6   /* setup messages */
7       @message void        MSG_TRANSACTION_INITIALIZE();
8
9   /* put the data back into the list */
10      @message Boolean     MSG_SAVE_TO_LIST();
11      @message void        MSG_SET_DBITEM(DBItem transactionItem,
12                               Boolean isInTransactionList);
13
14      @message void        MSG_TRANSACTION_SET_SOURCE(DBItem moneyBag);
15      @message void        MSG_TRANSACTION_SET_TARGET(DBItem moneyBag);
16      @message void        MSG_TRANSACTION_SET_DATE_TODAY();
17      @message void        MSG_TRANSACTION_SET_DATE(TimerDateAndTime *date);
18      @message void        MSG_TRANSACTION_SET_TYPE(short int type);
19      @message void        MSG_TRANSACTION_SET_PAYEE(DBItem payee);
20      @message DBItem      MSG_TRANSACTION_SET_PAYEE_STRING(char *string,
21                               optr list,
22                               DBItem defaultMoneyBag);
23      @message void        MSG_TRANSACTION_SET_MEMO(DBItem memo);
24      @message void        MSG_TRANSACTION_SET_AMOUNT(long int amount);
25      @message void        MSG_TRANSACTION_SET_NUMBER(long int number);
26      @message void        MSG_TRANSACTION_DELETE();
27      @message void        MSG_TRANSACTION_DELETE_MEMO();
28
29   /* messages for getting data from a transaction */
30
31      @message int         MSG_GET_DATE_STRING(char *string,
32                               DateTimeFormat format);
33      @message int         MSG_GET_AMOUNT_STRING(char *string);
34      @message int         MSG_GET_PAYEE_STRING(char *string);
35      @message int         MSG_GET_TYPE_STRING(char *string, DBItem accountDBItem);
36      @message byte        MSG_GET_TRANSACTION_TYPE();
37      @message int         MSG_GET_OTHER_MONEYBAG_STRING(char *string,
38                               DBItem mBag);
```

Copyright © 1994 Intuit

TRANSACTION STRUCTURE
(transact.gh)

```
39    @message int        MSG_TRANSACTION_GET_MEMO_STRING(char *string);
40    @message DBItem     MSG_TRANSACTION_GET_PAYEE();
41    @message DBItem     MSG_TRANSACTION_GET_SOURCE();
42    @message DBItem     MSG_TRANSACTION_GET_TARGET();
43    @message DBItem     MSG_TRANSACTION_GET_MEMO();
44    @message long int   MSG_TRANSACTION_GET_NUMBER();
45    @message word       MSG_TRANSACTION_GET_DATE_SCALAR();
46    @message void       MSG_TRANSACTION_GET_DATE(TimerDateAndTime *date);
47    @message Boolean    MSG_TRANSACTION_GET_UPLOADED_STATUS();
48    @message Boolean    MSG_TRANSACTION_GET_EDIT_AFTER_UPLOAD_STATUS();
49    @message byte       MSG_TRANSACTION_GET_CLEARED_STATE();
50    @message Boolean    MSG_TRANSACTION_GET_ITEMIZED_STATUS();
51    @message void       MSG_ADJUST_BALANCES_FOR_ADD();
52    @message void       MSG_ADJUST_BALANCES_FOR_DELETE();
53    @instance TimerDate&Time   TI_date;
54    @instance long int         TI_amount;
55    @instance DBItem           TI_payeeItem;
56    @instance DBItem           TI_memoItem;
57    @instance DBItem           TI_sourceItem;
58    @instance DBItem           TI_targetItem;
59    @instance DBItem           TI_transactionItem;
60    @instance long int         TI_number;
61    @instance char             TI_payee[MAX_NAME_LEN+1];
62    @instance char             TI_memo[MAX_NAME_LEN+1];
63    @instance Boolean          TI_alreadyInList;
64    @instance byte             TI_cleared:2;
65    @instance byte             TI_unused:6;
66    @instance short int        TI_type;
67    @instance Boolean          TI_uploaded;
68    @instance Boolean          TI_editAfterUpload;
69    @instance Boolean          TI_itemized;
70    @instance EXTERNAL_ID_TYPE TI_uid;
71    @endc
```

Copyright © 1994 Intuit

ACCOUNT STRUCTURE
(account.h)

```
1    // account.h
2    // Here's the account structure, with associated transaction slip structure:
3    /* On disk structure of an account */
4    typedef struct acct_type {
5        MONEY_BAG_COMMON_TYPE moneyBag;
6        long int balance;
7        long int clearedBalance;
8        char accountNumber[ACCOUNT_NUMBER_LEN + 1];
9        char description[ACCOUNT_DESCRIPTION_LEN + 1];
10       long int nextCheckNumber;
11       struct {
12           word hasChecks:1;
13           word hasATMCard:1;
14           word hasRunningBalance:1;
15           word type:4; /* CREDIT_CARD_ACCOUNT, CASH_ACCOUNT, BANK_ACCOUNT
16   */
17           word cardType:3;   /* AMEX_CARD ... */
18           word unused:6;     /* sum of bits = 16 */
19       } flags;
20       DBItem lastSetBalanceItem;  /* Last set balance transaction in the
21                                   * the account.  Used to adjust balances.
22                                   */
23
24       DBItem moreInfo;
25   } ACCOUNT_TYPE;
26
27   typedef struct acct_initializer {
28       char name[MONEY_BAG_NAME_LEN+1];
29       word hasChecks:1;
30       word hasATMCard:1;
31       word type:4; /* CREDIT_CARD_ACCOUNT, CASH_ACCOUNT, BANK_ACCOUNT */
32       BITMAP_ID_TYPE bitmap;
33   } ACCOUNT_INITIALIZER_TYPE;
34
35   typedef struct acct_and_type_type {
36       DBItem account;
37       byte slipType;  /* Reciept, Check, Charge... */
38   } ACCOUNT_AND_TYPE_TYPE;
```

Copyright © 1994 Intuit

CREATE NEW TRANSACTION
(translip.goc)

```
1    // translip1.goc
2    // Function for creating a new transaction. Form to use is passed as parameter calls
3    // MSG_TRANSACTION_INITIALIZE to init transaction data calls
4    // MSG_TRANSACTION_FORM_INITIALIZE, MSG_FILL_SLIP to fill in form
5    @method TransactionContextClass, MSG_REQUEST_NEW_TRANSACTION
6    /*
7    Open a new slip for the transactionObject.
8
9    Boolean MSG_REQUEST_NEW_TRANSACTION(optr form)
10   */
11   {
12      Boolean opened;
13      optr document;
14      optr transaction;
15
16      /* Ask the context manager to close the current context
17       * This may be refused if the current context doesn't give up control.
18       */
19      opened = @call ContextManager::MSG_REQUEST_PUSH_CONTEXT();
20      if (opened)
21      {
22      @call oself::MSG_PREPARE_SCENE();
23      document = @call process::MSG_GET_CURRENT_DOCUMENT();
24      SET_PSELF->CI_document = document;
25
26         pself->TCI_transactionForm = form;
27      transaction =
28         @call pself->TCI_transactionForm::MSG_GET_TRANSACTION();
29      SET_PSELF;
30      pself->TCI_transaction = transaction;
31      ObjMarkDirty(oself);
32
33      /* use cancel when editting a new transaction */
34      @call DeleteTransactionTrigger::
35
36   MSG_GEN_REPLACE_VIS_MONIKER_TEXT("Cancel",VUM_DELAYED_VIA_UI_QUE
37   UE);
38
```

Copyright © 1994 Intuit

CREATE NEW TRANSACTION
(translip.goc)

```
39      /* set up the transaction object */
40      @call transaction::MSG_TRANSACTION_INITIALIZE();
41
42      /* have the transaction fill in the slip */
43      @call form::MSG_TRANSACTION_FORM_INITIALIZE(TRUE);
44      @call form::MSG_FILL_SLIP();
45
46      @call oself::MSG_OPEN_CONTEXT(@TransactionSlipScene);
47      }
48      NoMethodParamWarning;
49      return opened;
50  }
```

Copyright © 1994 Intuit

EDIT EXISTING TRANSACTION
(translip.goc)

```
1    // translip2.goc
2    // Function for editing an existing transaction calls MSG_TRANSACTION_INITIALIZE to init
3    // transaction data calls MSG_TRANSACTION_FORM_INITIALIZE, MSG_FILL_SLIP to fill
4    // in form
5
6    @method TransactionContextClass, MSG_REQUEST_OPEN_TRANSACTION
7    /*
8    Open a transaction from a transaction that is currently in the
9    TransactionList.
10
11
12   Boolean MSG_REQUEST_OPEN_TRANSACTION(DBItem transactionItem, Boolean isSaved)
13   */
14   {
15       optr transaction, form;
16       Boolean o
```

SET-UP TRANSACTION FORM SPECIALIZED FOR CHECKS
(tforms.goc)

```
1    // tforms1.goc
2    // Filling in/setup transaction slip for generic form, and specialized for checks:
3    @method TransactionFormClass, MSG_FILL_SLIP
4    /*
5    Fill in all of my gadgets with values from my instance variables.
6    Add my form as a child of TransactionSlipScene.
7
8    void MSG_FILL_SLIP();
9    */
10   {
11      optr form;
12
13      @call oself::MSG_FILL_DATE();
14      @call oself::MSG_FILL_AMOUNT();
15      @call oself::MSG_FILL_PAYEE();
16      @call oself::MSG_SETUP_PICKERS();
17      @call oself::MSG_FILL_MEMO();
18
19      form = SET_PSELF->TFI_formGadget;
20
21      @send form::MSG_GEN_SET_NOT_USABLE(VUM_DELAYED_VIA_UI_QUEUE);
22      @send TransactionSlipScene::MSG_GEN_ADD_CHILD(form,
23                          (CCF_MARK_DIRTY|CCO_FIRST));
24      @send form::MSG_GEN_SET_USABLE(VUM_NOW);
25      NoMethodParamWarning;
26
27      return;
28   }
29
30   @method TransactionFormClass, MSG_TRANSACTION_FORM_INITIALIZE
31   /*
32   Set up this transaction form so that it is in a reasonable default state.
33
34   void     MSG_TRANSACTION_FORM_INITIALIZE(Boolean newTrans)
35   */
36   {
37      pself->TFI_payeeClass = &PayeeListClass;
38      pself->TFI_newTransaction = newTrans;
```

Copyright © 1994 Intuit

SET-UP TRANSACTION FORM SPECIALIZED FOR CHECKS
(tforms.goc)

```
39      /* get the date for later use */
40      @callpself->TFI_transaction::MSG_TRANSACTION_GET_DATE(&(pself->TFI_date));
41
42      ObjMarkDirty(oself);
43      NoMethodParamWarning;
44      return;
45   }
```

Copyright © 1994 Intuit

CHECK-SPECIFIC VERSION
(check.goc)

```
1     // check1.goc
2     // Now, the check-specific version
3     @method CheckFormClass, MSG_FILL_SLIP
4     /*
5     Fill in my memo and my check number.
6
7     void MSG_FILL_SLIP();
8     */
9     {
10       @call oself::MSG_FILL_NUMBER();
11       @callsuper();
12
13       NoMethodParamWarning;
14       return;
15    }
16
17    @method CheckFormClass, MSG_FILL_NUMBER
18    /*
19    Fill in the check's checkNumber field
20
21       void MSG_FILL_NUMBER()
22    */
23    {
24       long int number;
25
26       number = @call pself->TFI_transaction::MSG_TRANSACTION_GET_NUMBER();
27
28       @call SET_PSELF->CTI_numberGadget::
29            MSG_GEN_VALUE_SET_VALUE( number, FALSE);
30
31       NoMethodParamWarning;
32       return;
33    }
```

Copyright © 1994 Intuit

CHECK-SPECIFIC VERSION OF INITIALIZING FORM
(check.goc)

```
1    // check2.goc
2    // Now, the check-specific version of initializing the form. Note @callsuper
3    // does generic transaction stuff first, then this code is special for checks
4    @method CheckFormClass, MSG_TRANSACTION_FORM_INITIALIZE
5    /*
6    Set up this transaction so that it is in a reasonable default state.
7
8    void     MSG_TRANSACTION_FORM_INITIALIZE(Boolean newTrans);
9    */
10   {
11      long int number;
12      DBItem sourceItem;
13      MemHandle newBlock;
14      optr amountParent;
15
16      @callsuper();
17
18      newBlock = ObjDuplicateResource(OptrToHandle(@CheckInteraction), 0, 0);
19
20      SET_PSELF;
21      pself->TFI_dateGadget = SWAP_OPTR_BLOCK(newBlock,@CheckDateTrigger);
22      @call pself->TFI_dateGadget::MSG_GEN_TRIGGER_SET_DESTINATION(oself);
23      SET_PSELF;
24      pself->TFI_formGadget = SWAP_OPTR_BLOCK(newBlock,@CheckInteraction);
25      pself->TFI_memoGadget = SWAP_OPTR_BLOCK(newBlock,@CheckMemoText);
26      pself->CTI_numberGadget = SWAP_OPTR_BLOCK(newBlock,@CheckNumberValue);
27
28      pself->TFI_payeeTextGadget = SWAP_OPTR_BLOCK(newBlock,@CheckPayeeText);
29      pself->TFI_payeeParentGadget = SWAP_OPTR_BLOCK(newBlock,@CheckSecondRow);
30      pself->TFI_payeeGadget = @PayeePickerDialog;
31
32      pself->TFI_pickerParentGadget = SWAP_OPTR_BLOCK(newBlock,@CheckFourthRow);
33      pself->TFI_sourceGadget = @SourceAccountPickerDialog;
34      pself->TFI_targetGadget = @ExpensePickerDialog;
35
36      amountParent = SWAP_OPTR_BLOCK(newBlock,@CheckAmountRow);
37      pself->TFI_amountGadget =
38         @call AmountText::MSG_GEN_COPY_TREE(newBlock,
```

Copyright © 1994 Intuit

CHECK-SPECIFIC VERSION OF INITIALIZING FORM
(check.goc)

```
39                          OptrToChunk(amountParent),
40                          (CCF_MARK_DIRTY|CCO_LAST));
41     SET_PSELF;
42     @call pself->TFI_amountGadget::
43        MSG_GEN_SET_USABLE(VUM_DELAYED_VIA_UI_QUEUE);
44
45     @call SET_PSELF->TFI_amountGadget::MSG_META_GRAB_FOCUS_EXCL();
46
47     SET_PSELF;
48     sourceItem = @call pself->TFI_transaction::MSG_TRANSACTION_GET_SOURCE();
49     if (newTrans && (sourceItem != NullHandle)) {
50        @call CurrentAccount::MSG_SET_MONEY_BAG_DBITEM(sourceItem);
51        number = @call CurrentAccount::MSG_GET_NEXT_NUMBER();
52        SET_PSELF;
53        @call pself->TFI_transaction::MSG_TRANSACTION_SET_NUMBER(number);
54     }
55
56     NoMethodParamWarning;
57     return;
58  }
```

Copyright © 1994 Intuit

CODE TO SAVE TRANSACTION FROM SLIP
(tforms.goc)

```
1    // tforms2.goc
2    // Code to save transaction from a slip. Note that it saves the type also
3    @method TransactionFormClass, MSG_SAVE_SLIP
4    /*
5    Get the data from my slip and then save this transaction to the
6    transaction list. Subclasses should override this to setup the
7    instance variables that should contain the data that is read
8    from the slip.
9
10   void    MSG_SAVE_SLIP();
11   */
12   {
13       Boolean validData, alreadyInList;
14       short int type;
15
16       validData = TRUE;   /* assume true until proven false */
17
18       /* if this is a transaction that has already been uploaded make
19        * sure they know what they are doing...
20        */
21       if (@call pself->TFI_transaction::MSG_TRANSACTION_GET_UPLOADED_STATUS())
22       {
23           if(EditUploadedTransactionQuery() == FALSE)
24           {
25               return FALSE;
26           }
27       }
28
29       /* Delete the original amount of the transaction, so that when
30        * we later add in the new amount for the transaction the
31        * net balance is correct.
32        */
33       SET_PSELF;
34       @call pself->TFI_transaction::MSG_ADJUST_BALANCES_FOR_DELETE();
35
36       /* get the amount, if it fails the data is no longer valid */
37       if (!@call oself::MSG_STUFF_SLIP_AMOUNT()) {
38           validData = FALSE;
```

Copyright © 1994 Intuit

CODE TO SAVE TRANSACTION FROM SLIP
(tforms.goc)

```
39      }
40
41      /* STUFF the date, if it fails the data is no longer valid */
42      if (validData && !@call oself::MSG_STUFF_SLIP_DATE()) {
43          validData = FALSE;
44      }
45
46      /* STUFF the pickers, if it fails the data is no longer valid */
47
48      if (validData && !@call oself::MSG_STUFF_SLIP_PICKER_ITEMS()) {
49          validData = FALSE;
50      }
51
52      if (!validData) {
53          /* Restore the old balance by adding back in the amount
54           * we deleted above.
55           */
56          SET_PSELF;
57          @call pself->TFI_transaction::MSG_ADJUST_BALANCES_FOR_ADD();
58      } else {
59          @call oself::MSG_STUFF_SLIP_PAYEE();
60          @call oself::MSG_STUFF_MEMO();
61          type = @call oself::MSG_GET_SLIP_TYPE();
62          SET_PSELF;
63          @call pself->TFI_transaction::MSG_TRANSACTION_SET_TYPE(type);
64
65          @call pself->TFI_transaction::MSG_SAVE_TO_LIST();
66
67      }
68
69      NoMethodParamWarning;
70      return validData;
71  }
```

Copyright © 1994 Intuit

RECEIPT-SLIP VERSION OF SETTING UP FORM
(receipt.goc)

```
1   // receipt.goc
2   // Receipt-slip version of setting up a form
3
4   @method ReceiptFormClass, MSG_TRANSACTION_FORM_INITIALIZE
5   /*
6   Set up this transaction so that it is in a reasonable default state.
7
8   optr    MSG_TRANSACTION_FORM_INITIALIZE(Boolean newTrans);
9   */
10  {
11      MemHandle newBlock;
12      optr titleMoniker;
13      optr amountParent;
14
15      @callsuper();
16
17      newBlock = ObjDuplicateResource(OptrToHandle(@SlipInteraction), 0, 0);
18
19      SET_PSELF;
20      pself->TFI_dateGadget = SWAP_OPTR_BLOCK(newBlock,@SlipDateTr
```

Copyright © 1994 Intuit

WITHDRAWAL SLIP SETUP
(bankslip.goc)

```
// bankslip1.goc
// Now, the withdrawal slip setup
@method WithdrawalFormClass, MSG_TRANSACTION_FORM_INITIALIZE
/*
Set up this transaction so that it is in a reasonable default state.

void    MSG_TRANSACTION_FORM_INITIALIZE(Boolean newTrans);
*/
{
optr list;
DBItem expense;
optr titleMoniker;
MemHandle blockHandle;
Boolean valid;

@callsuper();

SET_PSELF;
pself->TFI_sourceGadget = @SourceAccountPickerDialog;
pself->TFI_targetGadget = @ExpensePickerDialog;

if (newTrans)
{
list = @call process::MSG_GET_QUICKEN_LIST(&AccountListClass);
        // setup the source if it is not already set
SET_PSELF;

valid = @call list::MSG_ITEM_IN_LIST(pself->BTC_rememberedSourceItem);
if (!valid)
{
pself->BTC_rememberedSourceItem =
@call
list::MSG_GET_DEFAULT_BANK_ACCOUNT();
valid = @call list::MSG_ITEM_IN_LIST(pself-
>BTC_rememberedSourceItem);
if (!valid){
/* if no bank account exists then just default to the 1st
* item in the list. We know there is at least one item
```

Copyright © 1994 Intuit

WITHDRAWAL SLIP SETUP
(bankslip.goc)

```
 * because the form will not be summoned if there is not.
 */
SET_PSELF;
@call list::MSG_GET_NTH_DBITEM(1, &pself-
>BTC_rememberedSourceItem);
    }
}

/* setup the target to cash */
SET_PSELF;
pself->BTC_rememberedTargetItem =
@call list::MSG_GET_DEFAULT_CASH_ACCOUNT();

valid = @call list::MSG_ITEM_IN_LIST(pself->BTC_rememberedTargetItem);
if (!valid)
{
list = @call process::MSG_GET_QUICKEN_LIST(&ExpenseListClass);
SET_PSELF;
pself->BTC_rememberedTargetItem =
@call list::MSG_GET_DEFAULT_ITEM();
    }
}

SET_PSELF;
blockHandle = OptrToHandle(pself->TFI_titleGadget);
titleMoniker = SWAP_OPTR_BLOCK(blockHandle, @WithdrawalTitleMoniker);

@call pself->TFI_titleGadget::
MSG_GEN_USE_VIS_MONIKER(titleMoniker, VUM_DELAYED_VIA_UI_QUEUE);

Unused(newTrans);
NoMethodParamWarning;
return;
}
```

Copyright © 1994 Intuit

DEPOSIT SLIP SETUP
(bankslip.goc)

```
1    // bankslip2.goc
2    // Deposit slip setup
3    @method DepositFormClass, MSG_TRANSACTION_FORM_INITIALIZE
4    /*
5    Set up this transaction so that it is in a reasonable default state.
6
7    void     MSG_TRANSACTION_FORM_INITIALIZE(Boolean newTrans);
8    */
9    {
10   optr list;
11   optr titleMoniker;
12   MemHandle blockHandle;
13   Boolean valid;
14
15   @callsuper();
16
17   SET_PSELF;
18   pself->TFI_sourceGadget = @IncomePickerDialog;
19   pself->TFI_targetGadget = @DestinationAccountPickerDialog;
20
21
22   if (newTrans)
23   {
24   // setup the source and targets if they are not already set
25   list = @call process::MSG_GET_QUICKEN_LIST(&IncomeListClass);
26   SET_PSELF;
27   pself->BTC_rememberedSourceItem = @call list::MSG_GET_DEFAULT_ITEM();
28
29   list = @call process::MSG_GET_QUICKEN_LIST(&AccountListClass);
30   valid = @call list::MSG_ITEM_IN_LIST(pself->BTC_rememberedTargetItem);
31   if (!valid)
32   {
33   SET_PSELF->BTC_rememberedTargetItem =
34   @call list::MSG_GET_DEFAULT_BANK_ACCOUNT();
35
36   valid = @call list::
37   MSG_ITEM_IN_LIST(pself->BTC_rememberedTargetItem);
38   if (!valid){
```

Copyright © 1994 Intuit

DEPOSIT SLIP SETUP
(bankslip.goc)

```
39      /* if no bank account exists then just default to the 1st
40      *item in the list. We know there is at least one item
41      *because the form will not be summoned if there is not.
42      */
43      SET_PSELF;
44      @call list::
45      MSG_GET_NTH_DBITEM(1, &pself->BTC_rememberedTargetItem);
46      }
47
48      }
49      }
50
51      SET_PSELF;
52      blockHandle = OptrToHandle(pself->TFI_titleGadget);
53      titleMoniker = SWAP_OPTR_BLOCK(blockHandle, @DepositTitleMoniker);
54      @call pself->TFI_titleGadget::
55      MSG_GEN_USE_VIS_MONIKER(titleMoniker, VUM_DELAYED_VIA_UI_QUEUE);
56
57
58      Unused(newTrans);
59      NoMethodParamWarning;
60      return;
61      }
```

Copyright © 1994 Intuit

SETUP FOR EDITING TRANSACTION BASED ON ACCOUNT TYPE
(register.goc)

```
1    // register.goc
2    // Sets up editing of a transaction based on the account type.
3    // Once the "trigger" is specified, it will choose the appropriate slip based
4    // on the actual transaction type.
5
6    @method RegisterContextClass, MSG_ADD_REGISTER_TRIGGERS
7    /*
8    void MSG_ADD_REGISTER_TRIGGERS()
9    */
10   {
11   DBItem accountItem;
12   int moneyBagType, accountType;
13
14   accountItem = pself->RCI_moneyBagItem;
15
16   @call RegisterMoneyBag::MSG_SET_MONEY_BAG_DBITEM(accountItem);
17   moneyBagType = @call RegisterMoneyBag::MSG_GET_MONEY_BAG_TYPE();
18
19   if (moneyBagType == ACCOUNT_MONEY_BAG) {
20       accountType = @call RegisterMoneyBag::MSG_GET_ACCOUNT_TYPE();
21
22      switch (accountType) {
23         case BANK_ACCOUNT:
24             AddRegisterTrigger(@EditBankTrigger);
25         break;
26
27         case CREDIT_CARD_ACCOUNT:
28             AddRegisterTrigger(@EditCreditCardTrigger);
29         break;
30
31         case CASH_ACCOUNT:
32             AddRegisterTrigger(@EditCashTrigger);
33         break;
34      }
35
36         /* Only accounts can be deleted, and have balances set */
37         AddRegisterTrigger(@SetBalanceTrigger);
38
```

Copyright © 1994 Intuit

SETUP FOR EDITING TRANSACTION BASED ON ACCOUNT TYPE
(register.goc)

```
39      } else {
40          AddRegisterTrigger(@EditCategoryTrigger);
41          accountType = NO_ACCOUNT;
42      }
43
44      /* Remember this in order to properly remove the menu items when
45       * a register is deleted. (ie. the DBItem for the account will
46       * not be valid once the account is deleted.
47       */
48      SET_PSELF;
49      pself->RCI_accountType = accountType;
50      pself->RCI_moneyBagType = moneyBagType;
51
52      NoMethodParamWarning;
53  }
```

Copyright © 1994 Intuit

INITIALIZE TRANSACTION RECORD
(transact.goc)

```
1    // transact1.goc
2    // Init a transaction record
3    @method TransactionClass, MSG_TRANSACTION_INITIALIZE
4    /*
5    Set up this transaction so that it is in a reasonable default state.
6
7        void MSG_TRANSACTION_INITIALIZE();
8
9    */
10   {
11       pself->TI_amount = 0;
12       pself->TI_payee[0] = '\0';
13       pself->TI_memo[0] = '\0';
14       pself->TI_number = 0;
15       pself->TI_transactionItem = NullHandle;
16       pself->TI_alreadyInList = FALSE;
17       pself->TI_uploaded = FALSE;
18       pself->TI_editAfterUpload = FALSE;
19       pself->TI_cleared = TRANSACTION_UNCLEARED;
20       pself->TI_itemized = FALSE;
21       pself->TI_payeeItem = NullHandle;
22       pself->TI_memoItem = NullHandle;
23       pself->TI_unused = 0;
24       pself->TI_uid.id = 0;
25       pself->TI_uid.s.machine = 0;
26       memcpy(pself->TI_uid.s.time, "\0\0\0", 3);
27
28       @call oself::MSG_TRANSACTION_SET_DATE_TODAY();
29
30       ObjMarkDirty(oself);
31
32       NoMethodParamWarning;
33       return;
34   }
```

Copyright © 1994 Intuit

SAVE TRANSACTION RECORD INTO DATABASE
(transact.goc)

```
1    // transact2.goc
2    // Save a transaction record into store.
3
4    @method TransactionClass, MSG_SAVE_TO_LIST
5    /*
6    Save this transaction into the transaction list in the store.
7
8        Boolean MSG_SAVE_TO_LIST(void);
9
10   */
11   {
12       TRANSACTION_TYPE transaction;
13       optr list;
14
15       transaction.date.fields.year = pself->TI_date.TDAT_year - DATE_BASE_YEAR;
16       transaction.date.fields.month = pself->TI_date.TDAT_month;
17       transaction.date.fields.day =
18
19       transaction.amount
```

Copyright © 1994 Intuit

SAVE TRANSACTION RECORD INTO DATABASE
(transact.goc)

```
1    @method WalletContextClass, MSG_ADD_ACCOUNT_CARDS
2    /*
3    Create a gen trigger corresponding to the account passed in and
4    add it to the current scene.
5
6    void MSG_ADD_ACCOUNT_CARDS(void *itemPtr, DBItem accountDBItem)
7    */
8    {
9    #define MAX_CARDS   2
10
11       ACCOUNT_TYPE *accountPtr;
12       byte slipType[MAX_CARDS];
13       BITMAP_ID_TYPE bitmap[MAX_CARDS];
14       int i;
15
16       /* Initialize to no cards to display */
17       for (i = 0; i < MAX_CARDS; i++) {
18          slipType[i] = TRANSACTION_RECEIPT_SLIP;
19          bitmap[i] = NULL_BITMAP_ID;
20       }
21
22       /* Find out what card(s) to create for this account */
23       accountPtr = (ACCOUNT_TYPE *) itemPtr;
24       switch (accountPtr->flags.type) {
25
26          case BANK_ACCOUNT:
27             /* Create one for the checking account if it has checks */
28             if (accountPtr->flags.hasChecks) {
29                bitmap[0]   = CHECK_BITMAP_ID;
30                slipType[0] = TRANSACTION_CHECK_SLIP;
31             }
32
33             /* Create one card for the ATM if one exists */
34             if (accountPtr->flags.hasATMCard) {
35                bitmap[1]   = ATM_BITMAP_ID;
36                slipType[1] = TRANSACTION_RECEIPT_SLIP;
37             }
38             break;
```

Copyright © 1994 Intuit

SAVE TRANSACTION RECORD INTO DATABASE
(transact.goc)

```
39          case CASH_ACCOUNT:
40              bitmap[0]   = CASH_BITMAP_ID;
41              slipType[0] = TRANSACTION_RECEIPT_SLIP;
42              break;
43
44          case CREDIT_CARD_ACCOUNT:
45              bitmap[0]   = GetCreditCardBitmap(accountPtr->flags.cardType);
46              slipType[0] = TRANSACTION_CHARGE_SLIP;
47              break;
48
49          default:    /* Error, do nothing */
50              break;
51      }
52
53      /* Create the icons for the card(s) specified above */
54      for (i = 0; i < MAX_CARDS; i++) {
55          if (bitmap[i] != NULL_BITMAP_ID) {
56              @call WalletContent::MSG_ADD_NAMED_ICON(@WalletView,
57                                      &(accountPtr->moneyBag),
58                                      bitmap[i],
59                                      @TransactionContext,
60                                      (Message) MSG_REQUEST_OPEN_ACCOUNT,
61                                      accountDBItem,
62                                      slipType[i]);
63          }
64      }
65
66      NoMethodParamWarning;
67      return;
68  }
69
70  BITMAP_ID_TYPE GetCreditCardBitmap(int cardType)
71  /*
72   * Returns an optr to the bitmap refered to by the credit card type.
73   */
74  {
75      switch(cardType) {
76
```

Copyright © 1994 Intuit

SAVE TRANSACTION RECORD INTO DATABASE
(transact.goc)

```
 77          case VISA_CREDIT_CARD:
 78             return VISACARD_BITMAP_ID;
 79
 80          case AMEX_CARD:
 81             return AMEXCARD_BITMAP_ID;
 82
 83          case MASTER_CARD:
 84             return MASTERCARD_BITMAP_ID;
 85
 86          case GENERIC_CREDIT_CARD:
 87          default:
 88             return CREDITCARD_BITMAP_ID;
 89       }
 90    }
 91
 92
 93    @method TransactionContextClass, MSG_REQUEST_OPEN_ACCOUNT
 94    /*
 95    Open a transaction on account.  Default various fields as
 96    appropriate.
 97
 98    Boolean MSG_REQUEST_OPEN_ACCOUNT(DBItem accountItem, byte slipType);
 99    */
100    {
101       optr transaction, form;
102       optr document;
103       optr expenseList;
104       DBItem expense;
105       Boolean opened;
106       int len;
107       char helpCtx[] = "enter_wal_trans_form";
108
109
110       /* Ask the context manager to close the current context
111        * This may be refused if the current context doesn't give up control.
112        */
113       opened = @call ContextManager::MSG_REQUEST_PUSH_CONTEXT();
114       if (opened)
```

Copyright © 1994 Intuit

SAVE TRANSACTION RECORD INTO DATABASE
(transact.goc)

```
115     {
116         len = LocalStringSize(helpCtx);
117         @call SkywalkerPrimary::
118
119         MSG_META_ADD_VAR_DATA(ATTR_GEN_HELP_CONTEXT|VDF_SAVE_TO_STATE,
120                 len+1, helpCtx);
121
122         @call oself::MSG_PREPARE_SCENE();
123         document = @call process::MSG_GET_CURRENT_DOCUMENT();
124         SET_PSELF->CI_document = document;
125
126         @call oself::MSG_SELECT_NEW_TRANSACTION(slipType);
127         SET_PSELF;
128         transaction = pself->TCI_transaction;
129         form = pself->TCI_transactionForm;
130
131         ObjMarkDirty(oself);
132
133         /* set up the transaction object */
134         @call transaction::MSG_TRANSACTION_INITIALIZE();
135         @call transaction::MSG_TRANSACTION_SET_SOURCE(accountItem);
136         expenseList = @call document::MSG_GET_QUICKEN_LIST(&ExpenseListClass);
137         expense = @call expenseList::MSG_GET_DEFAULT_ITEM();
138         @call transaction::MSG_TRANSACTION_SET_TARGET(expense);
139
140         /* use cancel when editting a new transaction */
141         @call DeleteTransactionTrigger::
142
143         MSG_GEN_REPLACE_VIS_MONIKER_TEXT("Cancel",VUM_DELAYED_VIA_UI_QUE
144     UE);
145
146         /* have the transaction fill in the slip */
147         @call form::MSG_TRANSACTION_FORM_INITIALIZE(TRUE);
148         @call form::MSG_FILL_SLIP();
149
150         @call oself::MSG_OPEN_CONTEXT(@TransactionSlipScene);
151     }
152
```

Copyright © 1994 Intuit

SAVE TRANSACTION RECORD INTO DATABASE
(transact.goc)

```
153         NoMethodParamWarning;
154         return opened;
155     }
156
157     @method TransactionContextClass, MSG_SELECT_NEW_TRANSACTION
158     /*
159     Set the proper transaction object and form for this accountItem.
160
161     void MSG_SELECT_NEW_TRANSACTION(int slipType)
162     */
163     {
164
165         switch (slipType)
166         {
167         case TRANSACTION_CHECK_SLIP:
168             pself->TCI_transactionForm = @CheckForm;
169             break;
170
171         case TRANSACTION_RECEIPT_SLIP:
172             pself->TCI_transactionForm = @ReceiptForm;
173             break;
174
175         case TRANSACTION_DEPOSIT_SLIP:
176             pself->TCI_transactionForm = @DepositForm;
177             break;
178
179         case TRANSACTION_TRANSFER_SLIP:
180             pself->TCI_transactionForm = @TransferForm;
181             break;
182
183         case TRANSACTION_WITHDRAWAL_SLIP:
184             pself->TCI_transactionForm = @WithdrawalForm;
185             break;
186
187         case TRANSACTION_CHARGE_SLIP:
188             pself->TCI_transactionForm = @ChargeForm;
189             break;
190
```

Copyright © 1994 Intuit

SAVE TRANSACTION RECORD INTO DATABASE
(transact.goc)

```
191        case TRANSACTION_SET_BALANCE_SLIP:
192            pself->TCI_transactionForm = @SetBalanceForm;
193            break;
194
195        default:
196            pself->TCI_transactionForm = @ReceiptForm;
197            break;
198        }
199
200        pself->TCI_transaction =
201            @call pself->TCI_transactionForm::MSG_GET_TRANSACTION();
202        NoMethodParamWarning;
203        return;
204    }
205
206
207    @method IconPickerClass, MSG_PICK_ICON
208    /*
209    @prototype Boolean MSG_SELECT_ICON_IN_ARRAY(DBItem itemHandle,
210                                    word auxData);
211    */
212    {
213        @call oself::MSG_USE_MONEYBAG(itemHandle);
214
215        @call oself::MSG_CLOSE_PICKER();
216
217        /* Dismiss the dialog */
218        @send oself::MSG_GEN_GUP_INTERACTION_COMMAND(IC_DISMISS);
219
220        /* A super duper hack to make sure that the busy icon will be removed.
221         * The reason that this is a hack is that the busy flag doesn't really
222         * belong in the Contextmanager since this icon picker is operating
223         * on the internally mantained flag in ContextManager.
224         */
225        @call ContextManager::MSG_MARK_NOT_BUSY();
226
227        Unused(auxData);
228        NoMethodParamWarning;
```

Copyright © 1994 Intuit

SAVE TRANSACTION RECORD INTO DATABASE
(transact.goc)

```
229        return(TRUE);
230    }
231
232
233    @method PickerClass, MSG_USE_PAYEE
234    /*
235    Called when the use selects an payee from the picker. (ie. pressed "OK")
236
237    void MSG_USE_PAYEE(word selection, word numSelections, byte stateFlags);
238    */
239    {
240        char name[PAYEE_NAME_LEN+1];
241        optr cursor;
242        PAYEE_TYPE *payeePtr;
243
244        if (numSelections != 1) {
245            return;    /* Don't do anything if there isn't exactly one selected */
246        }
247
248        cursor = pself->PI_cursor;
249        /* Note: routine is one based */
250        if (@call cursor::MSG_GOTO_NTH_ITEM(selection+1)) {
251            payeePtr = @call cursor::MSG_LOCK_CURRENT_ITEM();
252            if (payeePtr == NullHandle)
253            {
254                /* Give up, and try to exit */
255                return;
256            }
257            strcpy(name, payeePtr->name);
258            DBUnlock(payeePtr);
259
260            GENSET_PSELF->PI_currentDBItem    =    @call
261    cursor::MSG_GET_CURRENT_DBITEM();
262        } else {
263            GENSET_PSEL
264
```

Copyright © 1994 Intuit

SAVE TRANSACTION RECORD INTO DATABASE
(transact.goc)

```
265    @method IconPickerClass, MSG_INITIALIZE_EXPENSE_ICONS
266    /*
267    Create the initial set of icons using the group of the current item.
268
269    @prototype void MSG_INITIALIZE_EXPENSE_ICONS();
270
271    (MSG_INITIALIZE_PICKER_ICONS) MSG_INITIALIZE_EXPENSE_ICONS;
272    */
273    {
274
275        optr expenseList, document;
276        EXPENSE_TYPE *expensePtr;
277        DBItem currentGroup, currentItem;
278
279        /* Current expense item selected in the picker */
280        currentItem = pself->PI_currentDBItem;
281
282        @call CurrentMoneyBag::MSG_SET_MONEY_BAG_DBITEM(currentItem);
283
284                      if        ( @ c a l l
285    CurrentMoneyBag::MSG_GET_MONEY_BAG_TYPE()==EXPENSE_MONEY_BAG) {
286
287            expenseList = @call CurrentMoneyBag::MSG_GET_MONEY_BAG_LIST();
288
289            expensePtr = @call expenseList::MSG_LOCK_ITEM(currentItem);
290            if(expensePtr == NullHandle)
291            {
292                /* Give up, try to exit */
293                return;
294            }
295
296            currentGroup = expensePtr->group;
297            DBUnlock(expensePtr);
298
299        } else {    /* Must be one of the account icons */
300            currentGroup = ACCOUNT_POPUP_IDENTIFIER;
301        }
302
```

Copyright © 1994 Intuit

SAVE TRANSACTION RECORD INTO DATABASE
(transact.goc)

```
303      /* Add popup to select expense group */
304      @call oself::MSG_CREATE_MONEY_BAG_ICON_POPUP(currentGroup);
305
306      /* Set up icons in the current group */
307      @call oself::MSG_CREATE_MONEY_BAG_PICKER_ICONS(currentGroup);
308
309      NoMethodParamWarning;
310   }
311
312   @method ListPickerClass, MSG_DISPLAY_PAYEE_LINE
313   /*
314   Display the nth item in the gen dymamice list.
315
316   void MSG_DISPLAY_PAYEE_LINE(optr list, word item);
317   */
318   {
319      char name[PAYEE_NAME_LEN+1];
320      optr cursor;
321      PAYEE_TYPE *categPtr;
322
323      cursor = pself->PI_cursor;
324      /* Note: routine is one based */
325      @call cursor::MSG_GOTO_NTH_ITEM(item+1);
326      categPtr = @call cursor::MSG_LOCK_CURRENT_ITEM();
327      if (categPtr == NullHandle)
328      {
329         /* Give up and try to exit */
330         return;
331      }
332      memcpy(name, categPtr->name, PAYEE_NAME_LEN);
333
334      DBUnlock(categPtr);
335
336      @call list::MSG_GEN_DYNAMIC_LIST_REPLACE_ITEM_TEXT(item, name);
337
338      NoMethodParamWarning;
339   }
340
```

Copyright © 1994 Intuit

SAVE TRANSACTION RECORD INTO DATABASE
(transact.goc)

```
341    @method TransactionListClass, MSG_ADD_TRANSACTION
342    /*
343    Given a pointer to an Transaction structure, allocate space, and copy the
344    contents into a DBItem and point to it from my chunk array.
345
346    DBItem MSG_ADD_TRANSACTION(TRANSACTION_TYPE* newTransPtr)
347    */
348    {
349       DBItem newItem;
350       optr document;
351       word error;
352
353       document = pself->QLI_document;
354       newItem = @call self::MSG_ADD_ITEM(newTransPtr, sizeof(TRANSACTION_TYPE));
355
356       @call document::MSG_GEN_DOCUMENT_UPDATE(&error);
357
358       NoMethodParamWarning;
359       return newItem;
360    } /* MSG_ADD_TRANSACTION */
361
362
363    @method TransactionListClass, MSG_REPLACE_TRANSACTION
364    /*
365    Replace the contents of the passed transactionItem with the
366    data pointed to by transaction.  After that, update
367    the vm file so it is certain to be in a good state.
368
369    Boolean MSG_REPLACE_TRANSACTION(DBItem transactionItem,
370                         TRANSACTION_TYPE *transaction);
371    */
372    {
373       Boolean answer;
374       optr document;
375       word error;
376
377       document = pself->QLI_document;
378
```

Copyright © 1994 Intuit

SAVE TRANSACTION RECORD INTO DATABASE
(transact.goc)

```
379        answer = @call oself::MSG_REPLACE_ITEM(transactionItem, transaction,
380                         sizeof(TRANSACTION_TYPE));
381        @call document::MSG_GEN_DOCUMENT_UPDATE(&error);
382
383        NoMethodParamWarning;
384        return answer;
385    }
386
387    @method FolderContentClass, MSG_ADD_NAMED_ICON
388    /*
389    Create a gen trigger corresponding to the account passed in and
390    add it to the current scene.
391
392    void MSG_ADD_NAMED_ICON(optr view,
393        MONEY_BAG_COMMON_TYPE *moneyBagPtr,
394            BITMAP_ID_TYPE bitmapID,
395                optr target,
396                Message msg,
397                    DBItem filterCriteria,
398                    word auxData);
399    */
400    {
401        optr newFolder;
402
403        /* Create a new card in the memory block of the scene */
404        newFolder = ObjInstantiate(OptrToHandle(oself), &NamedIconVisClass);
405
406        /* Must come before MSG_SET_FOLDER_CONTENTS */
407        @call newFolder::MSG_INITIALIZE_FOLDER(FALSE);
408
409        @call newFolder::MSG_SET_FOLDER_CONTENTS(view, bitmapID, moneyBagPtr);
410        @call newFolder::MSG_SET_FOLDER_ACTION(target, msg,
411                         filterCriteria, auxData);
412
413
414        @call oself::MSG_VIS_MARK_INVALID(VOF_WINDOW_INVALID,
415                         VUM_DELAYED_VIA_UI_QUEUE);
416
```

Copyright © 1994 Intuit

SAVE TRANSACTION RECORD INTO DATABASE
(transact.goc)

```
417        @call oself::MSG_VIS_ADD_CHILD(newFolder,(CCF_MARK_DIRTY|CCO_LAST));
418
419        NoMethodParamWarning;
420        return;
421    }
422
423    @method NamedIconVisClass, MSG_VIS_DRAW
424    /*
425    Draw the icon, and name at the position specified by the instance variables
426    of the folder.
427    */
428    {
429        MemHandle bitmapHandle;
430        Bitmap *bitmapPtr;
431        optr bitmap;
432        int left, top, width, iconH;
433        int iconX,iconY;
434        int textX,textY, textWidth;
435        int strLen;
436
437        left = pself->VI_bounds.R_left;
438        top = pself->VI_bounds.R_top;
439        width = pself->VI_bounds.R_right - pself->VI_bounds.R_left;
440
441        bitmap = GetBitmapOptr(pself->CVC_bitmap);
442
443        GrSetMixMode(gstate, MM_COPY);
444        GrSetAreaColor(gstate, CF_INDEX, C_BLACK, 0, 0);
445
446        {
447            /* Copy bitmap, center it and paint it above the name */
448            MemLock(bitmapHandle = OptrToHandle(bitmap));
449
450            bitmapPtr = LMemDeref(bitmap);
451            iconX = left + (width - bitmapPtr->B_width)/2;
452
453            iconY = top;
454            iconH = bitmapPtr->B_height;
```

Copyright © 1994 Intuit

SAVE TRANSACTION RECORD INTO DATABASE
(transact.goc)

```
455         GrSetMixMode(gstate, MM_COPY);
456         GrFillBitmap(gstate, iconX, iconY, bitmapPtr, NULL);
457
458         MemUnlock(bitmapHandle);
459     }
460
461     /* Draw text underneath the icon */
462         /* < < > > Need to make sure name isn't too long */
463     pself = ObjDerefVis(oself);
464     strLen = LocalStringSize(pself->CVC_name);
465     textWidth = GrTextWidth(gstate, pself->CVC_name, strLen);
466     textX = left + (width - textWidth)/2;
467     textY = top + (iconH + ICON_TEXT_SPACING);
468     GrDrawText(gstate, textX, textY, pself->CVC_name, strLen);
469
470     @callsuper();
471     NoMethodParamWarning;
472 }
473
474
475
476
```

Copyright © 1994 Intuit

While the invention has been particularly shown and described with reference to preferred embodiments thereof it will be understood by those skilled in the art that various changes in form and details may be made therein without departing from the spirit and scope of the invention.

We claim:

1. A computer implemented method for tracking transactions with a computer including a processor for executing code, input/output devices for transfer of data, a display for displaying data and a memory for storing account data for a plurality of accounts, each account having a plurality of fields for the account data, comprising:

storing each of a plurality of transaction images in association with an account store for an account, each account store associated with at least one entry sequence defining a sequence of inputs to a subset of fields of the account, displaying the plurality of transaction images on said display, receiving a user input selecting one of said images by an input to an input/output device, and executing an entry sequence for the account store associated with the selected transaction image for entry of transaction data into the subset of fields defined by the entry sequence.

2. The tracking method of claim 1 further comprising:

displaying said subset of fields for entry of transaction data in response to said execution of the entry sequence, receiving transaction data for said subset of fields, storing said transaction data in the account store associated with the selected transaction image.

3. The tracking method of claim 1 wherein said transaction images are representations of transaction instruments and displaying comprises displaying the transaction images in a visual representation of a wallet.

4. The tracking method of claim 1 wherein each transaction image is associated with a single entry sequence.

5. The tracking method of claim 1 wherein each transaction image is associated with a single account store.

6. The tracking method of claim 1 wherein each transaction image is associated with a subset of selected ones of the fields for an account, each account having a plurality of said subset.

7. The tracking method of claim 1 wherein said executing of an entry sequence includes automatically entering transaction data into one or more of said subsets of fields.

8. The tracking method of claim 1 wherein said computer includes an activation routine and said displaying a plurality of transaction images on said display is executed directly in response to said activation routine without need for user input.

9. The tracking method of claim 1 wherein said computer forms part of a computer system including a plurality of external devices for providing transaction data to said computer.

10. The tracking method of claim 9 wherein one of said external devices is a terminal providing transaction data and said step of receiving transaction data receives transaction data directly from said terminal.

11. The tracking method of claim 10 wherein said terminal provides merchant identification as part of said transaction data.

12. The tracking method of claim 10 wherein said terminal provides standard industry codes as part of said transaction data.

13. The tracking method of claim 1 wherein said transaction image is an image of a credit card.

14. The tracking method of claim 1 wherein said transaction image is an image of an ATM card.

15. The tracking method of claim 1 wherein said transaction image is an image of a debit card.

16. The tracking method of claim 1 wherein said transaction image is an image of cash.

17. The tracking method of claim 1 wherein said executing of the entry sequence includes automatically sequencing through said subset of fields and returning to said transaction image display for selection of another transaction image.

18. The tracking method of claim 1 wherein said transaction images are visual representations of categories and displaying comprises displaying the transaction images in a visual representation of a wallet.

19. The tracking method of claim 1 wherein said transaction images are visual representations of financial accounts and displaying comprises displaying the transaction images in a visual representation of a wallet.

20. A tracking apparatus including a computer having a processor for executing code, input/output devices for transfer of data, a display for displaying data and a memory for storing account data for a plurality of accounts, each account having a plurality of fields for the account data, the apparatus comprising:

means for storing each of a plurality of transaction images in association with an account store, each account store associated with at least one entry sequence defining a sequence of inputs to a subset of fields of the account, means for displaying the plurality of transaction images on said display, means for receiving a user input selecting one of said images by an input to an input/output device, and means for executing an entry sequence for the account store associated with the selected transaction image for entry of transaction data into the subset of fields defined by the entry sequence.

21. The tracking apparatus of claim 20, further comprising:

means for displaying said subset of fields for entry of transaction data in response to said execution of the entry sequence, means for receiving transaction data for said subset of fields, means for storing said transaction data in the account store associated with the selected transaction image.

22. The tracking apparatus of claim 20 wherein said transaction images are representations of transaction instruments and the means for displaying comprises means for displaying the transaction images in a visual representation of a wallet.

23. The tracking apparatus of claim 20 wherein each transaction image is associated with a single entry sequence.

24. The tracking apparatus of claim 20 wherein each transaction image is associated with a single account store.

25. The tracking apparatus of claim 20 wherein each transaction image is associated with a subset of selected ones of the fields for an account, each account having a plurality of said subsets.

26. The tracking apparatus of claim 20 wherein said means for executing of an entry sequence automatically sequences through said subset of fields.

27. The tracking apparatus of claim 20 wherein said means for executing of an entry sequence automatically enters transaction data into one or more of said subset of fields.

28. The tracking apparatus of claim 20 wherein said computer includes an activation routine and said means for displaying a plurality of transaction images on said display is executed directly in response to said activation routine without need for user input.

29. The tracking apparatus of claim 20 wherein said computer forms part of a computer system including a plurality of external devices for providing transaction data to said computer.

30. The tracking apparatus of claim 29 wherein one of said external devices is a terminal providing transaction data and said step of receiving transaction data receives transaction data directly from said terminal.

31. The tracking apparatus of claim 30 wherein said terminal provides merchant identification as part of said transaction data.

32. The tracking apparatus of claim 30 wherein said terminal provides standard industry codes as part of said transaction data.

33. The tracking apparatus of claim 29 wherein one of said external devices is a terminal providing transaction data and said receiving transaction data step receives transaction data directly from the terminal.

34. The tracking apparatus of claim 29 wherein one of said external devices is a host computer providing transaction data and said receiving transaction data step receives transaction data directly from the host computer.

35. The tracking apparatus of claim 29 wherein one of said external devices is connected to said computer through a wireless connection.

36. The tracking apparatus of claim 29 wherein one of said external devices is connected to said computer through a telephone connection.

37. The tracking apparatus of claim 20 wherein said transaction image is an image of a credit card.

38. The tracking apparatus of claim 20 wherein said transaction image is an image of an ATM card.

39. The tracking apparatus of claim 20 wherein said transaction image is an image of a debit card.

40. The tracking apparatus of claim 20 wherein said transaction image is an image of cash.

41. The tracking apparatus of claim 20 wherein said means for executing of an entry sequence automatically sequences through said subset of fields and returns to said transaction image display for selection of another transaction image.

42. The tracking apparatus of claim 20 wherein said transaction images visual representations of categories and displaying comprises displaying the transaction images in a visual representation of a wallet.

43. The tracking apparatus of claim 20 wherein said transaction images are visual representations of financial accounts and displaying comprises displaying the transaction images in a visual representation of a wallet.

44. In an apparatus including a processor for executing a computer program, input/output devices for transfer of data, a display for displaying data, a computer readable memory for storing account data for a plurality of accounts, each account having a plurality of fields for the account data, the computer readable memory further storing a computer program that controls the processor to perform the operations of:

storing each of a plurality of transaction images in association with an account store, each account store associated with at least one entry sequence defining a sequence of inputs to a subset of the fields of the account, displaying the plurality of transaction images on said display, receiving a user input selecting one of said images by an input to an input/output device, and, executing the entry sequence for the account store associated with the selected transaction image for entry of transaction data into the subset of fields defined by the entry sequence.

45. The computer readable memory of claim 44, wherein the computer program further controls the processor to perform the operations of:

displaying the subset of fields for entry of transaction data in response to said execution of the entry sequence, receiving transaction data for the subset of fields, storing said transaction data in the account store associated with the selected transaction image.

46. The computer readable memory of claim 44, wherein said transaction images are representations of transaction instruments and the processor displays the transaction images in a visual representation of a wallet.

47. A computer readable memory for use with an apparatus including a processor, an input device for receiving data, and a display device for displaying data and images, the computer readable memory adapted to store account data for a plurality of accounts, each account having a plurality of fields for the account data, the computer readable memory further storing:

a plurality of transaction images, each transaction image associatable with an account store for an account, and adapted to be displayed on the display device;

an image display function, executable by the processor, that displays the plurality of transaction images on the display device;

a plurality of transaction entry sequences, each transaction entry sequence associated with a subset of fields of an account to define a sequence of inputs into the subset of fields, each transaction entry sequence adapted to cause the processor to display the subset of fields of an account on the display device;

a transaction image selector, executable by the processor, that selects a transaction image in response to a selection thereof received by the input device, and initiates the transaction entry sequence for the account associated with the selected transaction image;

a data entry function, executable by the processor, that receives transaction data input into a subset of fields displayed by a transaction entry sequence; and, a data store function, executable by the processor, that stores received transaction data into an account store associated with the selected transaction image.

* * * * *